United States Patent [19]

Nillesen

[11] Patent Number: 4,625,232

[45] Date of Patent: Nov. 25, 1986

[54] DEMODULATION CIRCUIT FOR A DIGITIZED CHROMINANCE SIGNAL HAVING A SAMPLING SIGNAL OSCILLATOR COUPLED TO A CHROMINANCE SIGNAL OSCILLATOR

[75] Inventor: Antonius H. H. J. Nillesen, Eindhoven, Netherlands

[73] Assignee: U.S. Phillips Corporation, New York, N.Y.

[21] Appl. No.: 560,768

[22] Filed: Dec. 12, 1983

[30] Foreign Application Priority Data

Dec. 22, 1982 [NL] Netherlands .......................... 8204936

[51] Int. Cl.[4] ............................................. H04N 9/66
[52] U.S. Cl. ..................................................... 358/23
[58] Field of Search ........................................... 358/23

[56] References Cited

U.S. PATENT DOCUMENTS 4,502,074 2/1985 Reitmeier ................................. 358/23
4,514,754 4/1985 Nillesen et al. ........................... 358/13

*Primary Examiner*—John W. Shepperd
*Attorney, Agent, or Firm*—Thomas A. Briody; William J. Streeter; Edward W. Goodman

[57] ABSTRACT

In a digital demodulation circuit for a chrominance signal of a color television signal having a first digital oscillator (35) for producing reference signals and a phase control loop (29, 17, 19, 49, 43) therefor, there is added in the phase control loop a signal combination (at 56) which is obtained from a phase control loop (67, 63, 59) of a second digital oscillator (77). This second digital oscillator derives the sampling frequency for sampling the chrominance signal from a signal source (83) of a constant frequency and couples this sampling frequency to the horizontal deflection frequency. By the addition in the phase control loop of the first oscillator, variations in the horizontal deflection frequency cannot lead to the undesired phenomenon of the first digital oscillator being pulled to a side-band frequency of the color subcarrier wave.

2 Claims, 2 Drawing Figures

DEMODULATION CIRCUIT FOR A DIGITIZED CHROMINANCE SIGNAL HAVING A SAMPLING SIGNAL OSCILLATOR COUPLED TO A CHROMINANCE SIGNAL OSCILLATOR

BACKGROUND OF THE INVENTION

The invention relates to a demodulation circuit for a digitized chrominance signal of a television signal sampled by means of a sampling signal at a sampling frequency, which circuit comprises a digital oscillator for obtaining from the sampling signal a digitized reference signal of the subcarrier frequency of the chrominance signal occurring at the sampling frequency for demodulating this chrominance signal, for which purpose a phase control signal input of the digital oscillator is coupled to an output of a color synchronization signal phase detection circuit.

The British Patent Application No. 2,061,053 discloses a demodulation circuit of the aforementioned kind for a chrominance signal which is sampled at a sampling frequency which is coupled to the horizontal deflection frequency. Upon variations of the horizontal deflection frequency, as they occur in non-standard color television signals, for example, color television signals originating from video recorders, this demodulation circuit is found to no longer operate satisfactorily.

SUMMARY OF THE INVENTION

The invention has for its object to provide such a demodulation circuit also suitable for color television signals whose horizontal deflection frequency may vary. According to the invention a demodulation circuit of the kind mentioned in the opening paragraph is therefore characterized in that the sampling signal is obtained by means of a second digital oscillator from a signal source of a constant frequency, an input for a digital number of this second digital oscillator being coupled to an output of a phase detection circuit, as a result of which the frequency and phase ratio between the sampling signal and a signal of the horizontal deflection frequency is kept constant, which input for the digital number is further coupled to an input of a divide circuit for dividing a digital number obtained from an output of the color synchronization signal phase detection circuit by the digital number, an output of this divide circuit being coupled to an input for a digital number of the first-mentioned digital oscillator.

By the use of a signal source of a constant frequency and a second digital oscillator for obtaining the sampling signal, frequency variations of the horizontal deflection frequency can be ascertained and can be compensated for in the phase control loop of the first-mentioned digital oscillator. Thus, it is prevented that the phase control loop of the first-mentioned digital oscillator is pulled to one of the sideband frequencies of the color synchronization signal, which may be the case with a circuit in which the measures according to the invention have not been taken, and the required stability of the phase of the output signal of the first-mentioned digital oscillator is obtained.

The signal source of constant frequency can be used further for one or more of the following operations, such as, for example, teletext signal processing, conversion of the number of fields and time base correction.

DESCRIPTION OF THE DRAWINGS

The invention will now be described with reference to the drawings.

In the drawings.

DESCRIPTION OF THE PREFERRED EMBODIMENT

Figure 1:
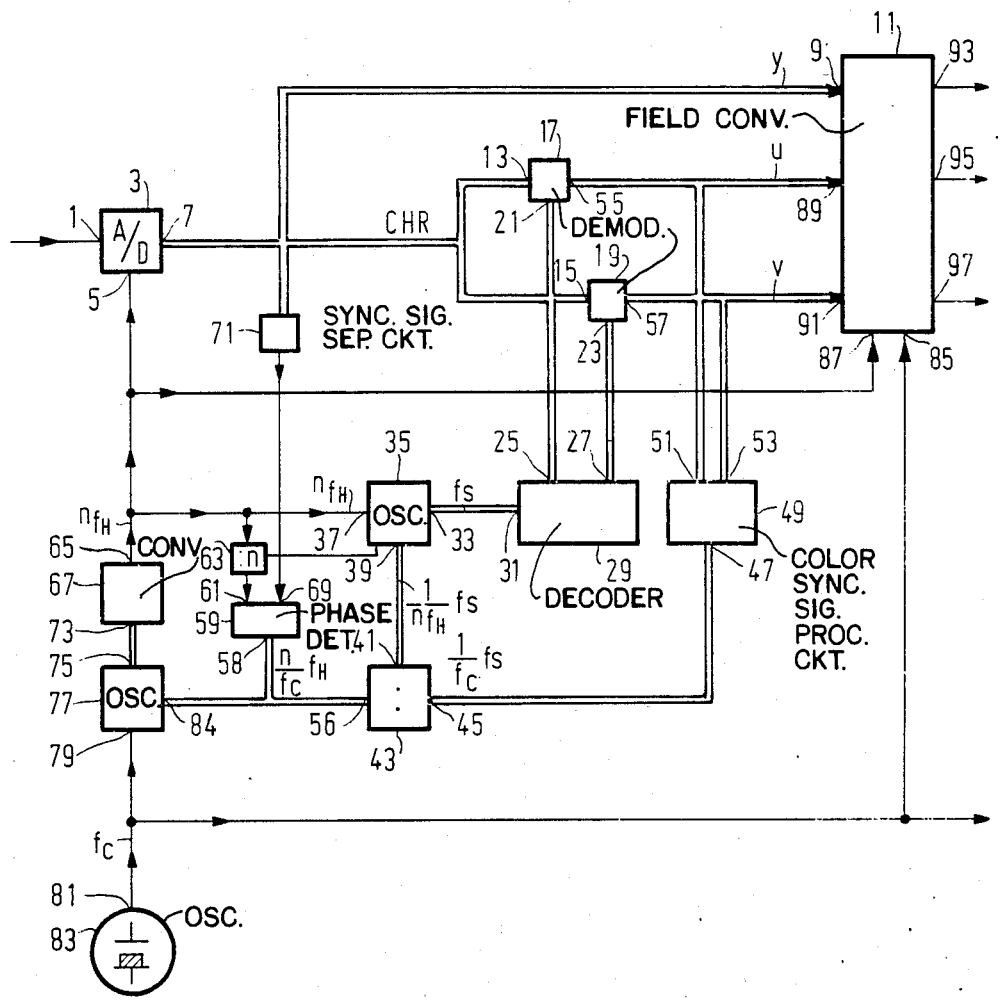
FIG. 1 shows in a simplified form a block diagram of a demodulation circuit according to the invention.

In FIG. 1, a color television signal is supplied to an input 1 of an analog-to-digital converter 3. The analog-to-digital converter 3 receives at an input 5, a sampling signal at a sampling frequency $n.f_H$, which is a number n times the horizontal deflection frequency $f_H$, where n need not be an integer.

There is obtained at an output 7 of the analog-to-digital converter 3, a digitized color television signal, which is split by a filtering arrangement (not shown) into a luminance signal Y supplied to an input 9 of an arrangement 11 for converting the number of fields and a chrominance signal CHR supplied to inputs 13 and 15, respectively, of digital synchronous demodulators 17 and 19, respectively.

Reference signal inputs 21 and 23 of the demodulators 17 and 19, respectively, each has supplied thereto a reference signal of the color subcarrier frequency of the chrominance signal, which is sampled at the aforementioned sampling frequency. These reference signals are obtained from outputs 25 and 27, respectively, of a function generator or decoder 29, which may be in the form of a read-only memory (ROM) and to whose input 31 is supplied a signal of the color subcarrier frequency $f_s$, which is sampled at the sampling frequency $n.f_H$.

Figure 2:
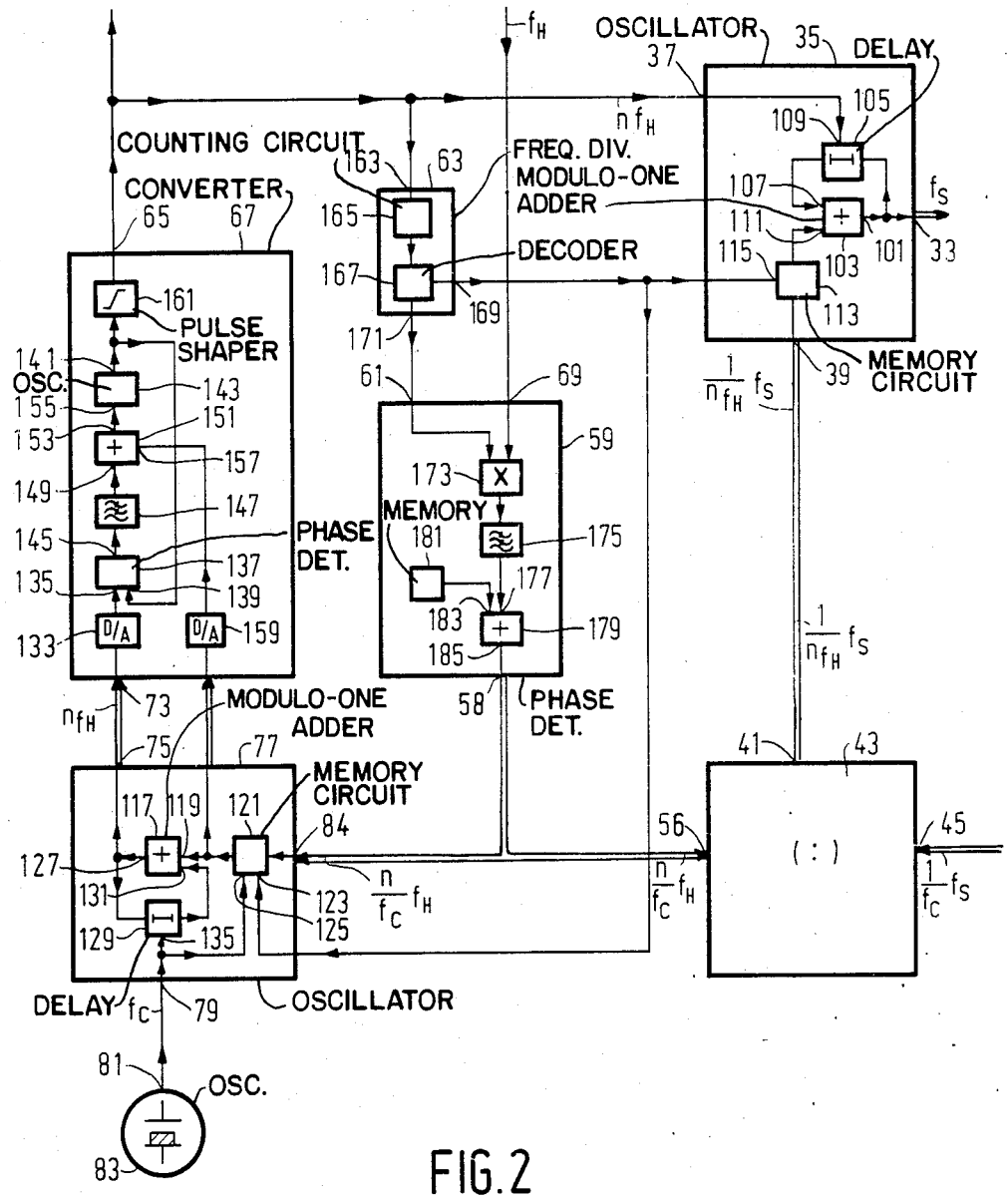
FIG. 2 shows an elaborated block diagram of a possible embodiment of a part of the demodulation circuit shown in FIG. 1.

The signal at the input 31 of the decoder 29 originates from an output 33 of a first digital oscillator 35. An input 37 of this first digital oscillator 35 has supplied thereto the sampling signal $n.f_H$ which is also supplied to the input 5 of the analog-to-digital converter 3. Further, the first digital oscillator 35 receives at an input 39, a digital signal combination, which, in order to obtain at the output 33 the frequency $f_s$, has to represent a digital number $$\frac{1}{n \cdot f_H} \cdot f_s,$$

which determines the frequency and phase of the signal at the output 33 sampled at the sampling frequency. With reference to FIG. 2, the operation of the first digital oscillator 35 will be described more fully.

The digital number $$\frac{1}{n \cdot f_H} \cdot f_s$$

at the input 39 of the first digital oscillator 35 is obtained from an output 41 of a divider circuit 43, of which an input 45 is connected to an output 47 of a color synchronization signal processing circuit 49, inputs 51 and 53 of which have supplied to them respective demodulated color difference signals U and V, originating, respectively, from outputs 55 and 57, of the demodulators 17 and 19, respectively. These color difference signals also comprise the demodulated color synchronization signal so that the demodulators 17, 19 constitute together with the color synchronization signal processing circuit 49, a color synchronization signal phase detection circuit, which, as is known, may also be provided, if desired, with a separate demodulator.

From the output 47 of the color synchronization signal phase detection circuit 17, 19, 49, is obtained a digital signal combination which represents a digital number $$\frac{f_s}{f_c},$$

which is proportional to the color subcarrier frequency $f_s$ and is inversely proportional to a constant frequency $f_c$; this will be described more fully hereinafter.

The proportionality to $f_s$ is obtained, for example, by adding to an output quantity of a conventional phase detector, a value $f_o$ which represents the nominal color subcarrier frequency. By a suitable choice of the loop amplification, the value supplied to the input 45 of the divider circuit 43 is made equal to $$\frac{1}{f_c} \cdot f_s.$$

In order to obtain at the output 41 of the divide circuit 43 the digital number $$\frac{1}{n \cdot f_H} \cdot f_s,$$

a digital number $$\frac{n}{f_c} \cdot f_H$$

will now have to be supplied to a further input 56 of the divide circuit 43. This is obtained from an output 58 of a phase detector 59, of which an input 61 is connected via a frequency divider 63, dividing by n, to an output 65 of a converter 67, to which the input 5 of the analog-to-digital converter 3 and the input 37 of the first digital oscillator 35 are also connected. A further input 69 of the phase detector 59 is connected via a synchronization signal separation circuit 71 to the output 7 of the analog-to-digital converter 3 and receives the synchronization signal at the horizontal deflection frequency $f_H$ from the television signal.

An input 73 of the converter 67 is connected to an output 75 of a second digital oscillator 77, of which an input 79 receives from an output 81 of an oscillator 83, the signal of a constant frequency $f_c$. An input 84 of the digital oscillator 77 has now supplied thereto the digital number $$\frac{n}{f_c} \cdot f_H$$

occurring at the output 58 of the phase detector 59. The converter 67 converts the output signal of the digital oscillator 77, which is a saw-tooth-shaped signal sampled at the frequency $f_c$ of the frequency $n.f_H$, into a pulsatory signal from which the frequency $f_c$ and other interfering frequencies are filtered.

When the output signal of the phase detector 59 is introduced in the indicated manner into the phase control loop of the first digital oscillator 35, the variations of the horizontal deflection frequency need not be readjusted in this control loop by the phase detection circuit 17,19,49. Thus, it is prevented that upon a variation of the horizontal deflection frequency, this phase control loop would be pulled to a side band frequency of the color subcarrier. In order to avoid phase errors in the output signal of the first digital oscillator 35, the frequency of the oscillator 83 has to be stable, hence, preferably, a crystal oscillator is used for this purpose.

The signal $f_c$ at the output 81 of the oscillator 83 in this case is further supplied to a reading clock signal input 85 of the arrangement 11 for converting the number of fields, of which a writing clock signal input 87 is connected to the output 65 of the converter 67. If desired, as a matter of course, the frequency dividing circuits may be arranged in the signal paths from the output 81 of the oscillator 83 to the input 79 of the second digital oscillator 77 and the reading clock signal input 85 of the arrangement 11 for converting the number of fields in order to obtain a desired frequency ratio.

The output signal of the oscillator 83 may further be used, for example, in a teletext signal processing circuit (not shown).

The arrangement 11 for converting the number of fields receives, in addition to the luminance signal Y sampled at the frequency $n.f_H$ at its input 9, at inputs 89 and 91, respectively, the color difference signals U and V, which are also sampled at the frequency $n.f_H$ and which are obtained from the outputs 55, 57 of the demodulators 17, 19. These three signals are written, for example, in a manner known per se by means of the signal of the writing clock frequency $n.f_H$ into a memory circuit of the arrangement 11 for converting the number of fields and are read by means of a signal at the reading clock signal frequency $f_c$ and supplied to three outputs 93, 95, 97 having a different field frequency.

It should be appreciated that instead of the arrangement 11 for converting the number of fields, a time base correction circuit may be used, where this is required.

In FIG. 2, the same reference numerals as in FIG. 1 are used for corresponding parts.

The output 33 of the first digital oscillator 35 is connected to an output 101 of a modulo-one adder 103, wherein the bits represent negative powers of 2 1 from 1 to N where N is the number of bits in the signal. In essence the adder is a modulo $2^N$ adder where the number in the adder is interpreted as being over a number $2^N$; that is the output represents a number from 0 to 1 or more accurately from 0 to $1-2^{-N}$. This output 101 is further connected through a delay circuit 105 to an input 107 of the adder 103. A clock signal input 109 of the delay circuit 105 receives the sampling signal of the sampling frequency $n.f_H$ supplied to the input 37 of the first digital oscillator 35. As a result, the signal at the output 101 of the adder 103 is fed back, after having been delayed each time by a sampling signal period, to the input 107 thereof. A further input 111 of the adder 103 has supplied to it the digital signal combination at the input 39, which represents the digital signal $$\frac{1}{n \cdot f_H} \cdot f_s,$$

through a memory circuit 113. Each time when a pulse occurs at an input 115 of the memory circuit 113, the signal combination present at that instant at the input 39 of the first digital oscillator 35 is stored in the memory circuit 113 and is passed on to a further input 111 of the adder 103 until the next pulse occurs.

Each time when a sampling signal pulse occurs at the input 109 of the delay circuit 105, the sum of the digital number at the input 111 and the digital number at the input 107 of the adder 103 obtained by the preceding addition occurs at the output 101 of the adder 103. When this sum exceeds the value one, the difference between this sum and the value one is fed back to the input 107. As a result, a digital saw-tooth signal of preferably sixteen or more bits per sample occurs at the output 101. This saw-tooth signal occurs at the color subcarrier frequency $f_s$. The most significant bits thereof are supplied to the output 33 as a signal combination of preferably ten or more bits per sample.

The second digital oscillator 77 has a modulo-one adder 117, an input 119 of which has supplied to it, via a memory circuit 121, the digital signal combination at the input 84, which represents the digital number $$\frac{n}{f_c} \cdot f_H.$$

The memory circuit 121 has a writing signal input 123, to which the same signal is supplied as to the input 115 of the memory circuit 113 of the first digital oscillator 35, and a reading signal input 125, to which the signal at the input 79 is supplied. An output 127 of the adder 117 is connected through a delay circuit 129 to a further input 131 of the adder 117. A clock signal input 135 of the delay circuit 129 has supplied to it the signal of the frequency $f_c$ which occurs at the input 79. The operation of the second digital oscillator 77 further corresponds to that of the first oscillator 35. The signal combination at the output 127 is preferably made to have twenty bits or more per sample, of which a signal combination of a number, for example, four to eight, of the most significant bits is supplied to the output 75. This signal combination represents a saw-tooth having a frequency n $f_H$, which is sampled at a frequency $f_c$.

By the converter 67, this signal, which is supplied to the input 73 thereof, is converted into a pulse signal having a frequency n.$f_H$. For this purpose, the signal combination at the input 73 is first converted by a digital-to-analog converter 133 into an analog saw-tooth signal which is supplied to an input 135 of a phase detector 137, another input 139 of which is connected to an output 141 of a controllable oscillator 143. An output 145 of the phase detector 137 is connected through a low-pass filter 147 to an input 149 of an adder 151, of which an output 153 is connected to a control signal input 155 of the oscillator 143. The oscillator 143 constitutes, together with the phase detector 137 and the low-pass filter 147, a phase-coupled loop which constitutes a very selective filter for the first harmonic of the saw-tooth signal at the input 135 of the phase detector 137. In order to be able, nevertheless, to cause the filter to respond sufficiently rapidly to the frequency variations of the signal n $f_H$, a further input 157 of the adder 151 has supplied to it a signal which is derived via a digital-to-analog converter 159 from the input 119 of the adder 117 of the second digital oscillator 77. As a result, the tuning of the phase-coupled loop serving as a filter, is adapted immediately upon rapid frequency variations.

The signal at the output 141 of the oscillator 143 is supplied through a pulse shaper 161 to the output 65 of the converter 67 and is thence supplied to an input 163 of the frequency divider 63, The frequency divider 63 comprises a counting circuit 165 connected to the input 163 and a decoder circuit 167 coupled to the counting circuit 165. The counting circuit 165 determines the division factor n. If n is not an integer, the counting circuit 165 may be replaced by another suitable frequency divider circuit. The decoder circuit 167 determines the instant of occurrence and the shape of the output signals which appear at outputs 169 and 171 at the frequency $f_H$. The output 169 supplies a pulse signal having the frequency $f_H$ to the inputs 115 and 123, respectively, of the memory circuits 113 and 121, respectively; the output 171 supplies a signal having the frequency $f_H$ to the input 61 of the phase detector 59. The pulse signal at the output 169 occurs each time after a division has been carried out in the divide circuit 43.

The inputs 61 and 69 of the phase detector 59 are connected to a multiplier 173. The signal at the input 61 is, each time, "plus one" during a half period and "minus one" during the other half period. The multiplier 173 supplies, periodically, a signal combination which represents a digital number and which indicates the deviation from the desired phase ratio. This signal combination is supplied via, a digital low-pass filter 175, to an input 177 of a summing circuit 179 which receives from a memory circuit 181 at a further input 183 a number which corresponds to the nominal horizontal deflection frequency. An output 185 of the summing circuit 179, connected to the output 58 of the phase detector 59, has supplied to it a signal combination which represents a digital number which, with a suitable choice of the loop amplification, is equal to $$\frac{n}{f_c} \cdot f_H$$

and which is supplied to the input 84 of the digital oscillator 77 and to the input 56 of the divide circuit 43.

The number $$\frac{1}{f_c} f_s$$

obtained at the input 45 of the divide circuit 43 is obtained in a similar manner as that at the input 56 after multiplication of the color synchronization signal by an output signal of the first digital oscillator 35.

If the digital-to-analog converter 133 is constructed as a multiplying converter, the signal originating from the output 141 of the oscillator 143 can be supplied thereto and the phase detector 173 can be dispensed with.

The phase-coupled loop of the converter 67 serving as a filter, may be replaced, if desired, by a decoder circuit which is arranged in front of the digital-to-analog converter 133 and converts the sampled saw-tooth into a sampled sine, and a band-pass filter having a linear phase characteristic which is arranged behind the digital-to-analog converter 133.

In the given example, the digital oscillators are provided with modulo-one adders. It should be appreciated that, if desired, other modulo values may be chosen when the remaining part of the circuit is adapted thereto.

Without change-over of filters, the circuit can be rendered suitable for processing PAL as well as NTSC signals by ensuring that the division factor n of the frequency divider 63 can be changed over. The change-over may be effected, if desired, automatically with the aid of a system identification circuit.

The frequency $n.f_H$ in the given embodiment is obtained by filtering the first harmonic of the saw-tooth signal from the output signal of the second digital oscillator 77. In addition to a number of harmonics of the saw-tooth signal, this output signal further comprises a number of harmonics of the signal of the frequency $f_c$ each having sideband frequencies deviating therefrom by a number of times the saw-tooth frequency. The frequency $n.f_H$ may be obtained, if desired, from one of these sideband frequencies. If, for example, the first upper sideband frequency of $f_c$ is chosen, the saw-tooth frequency $f_z$ has to be made so that $f_c+f_z=n.f_H$, so $f_z=n.f_H-f_c$. The number at the input 119 of the accumulator circuit 117, 129 then has to be made $$\frac{n \cdot f_H - f_c}{f_c} = \frac{n \cdot f_H}{f_c} - 1.$$

If desired, circuits for reducing the sampling frequency may be included in the signal paths to the color synchronization processing circuit and to the arrangement for converting the number of fields.

It should be appreciated that the terms "input" or "output" are to be understood to mean herein also a multiple input or output combination if signal combination of more than one bit has to be transmitted.

What is claimed is:

1. A demodulation circuit for a digitized chrominance signal of a color television signal sampled by means of a sampling signal at a sampling frequency, which circuit comprises a first digital oscillator for obtaining from the sampling signal a digitized reference signal of the subcarrier frequency of the chrominance signal, occurring at the sampling frequency, for demodulating this chrominance signal, for which purpose a phase control signal input of the digital oscillator is coupled to an output of a color synchronization signal phase detection circuit, characterized in that the sampling signal is obtained, by means of a second digital oscillator, from a signal source of a constant frequency, phase control signal input for a digital number of this second digital oscillator being coupled to an output of a phase detection circuit, as a result of which the frequency and phase ratio between the sampling signal and a signal of the horizontal deflection frequency is kept constant, which input for the digital number is further coupled to an input of a divide circuit for dividing a digital number, obtained from an output of the color synchronization signal phase detection circuit, by the digital number, an output of this divide circuit being coupled to the phase control signal input of the first digital oscillator.

2. A demodulation circuit as claimed in claim 1, characterized in that between an output of the second digital oscillator and a sampling signal input of an analog-to-digital converter for digitizing at least the chrominance signal, the demodulation circuit further comprises a digital-to-analog converter and a phase-coupled loop, to which an input signal combination of the second digital oscillator is supplied via a digital-to-analog converter.

* * * * *